Sept. 6, 1927.
W. A. MEAD
1,641,345
RAT GUARD
Filed Aug. 9, 1926
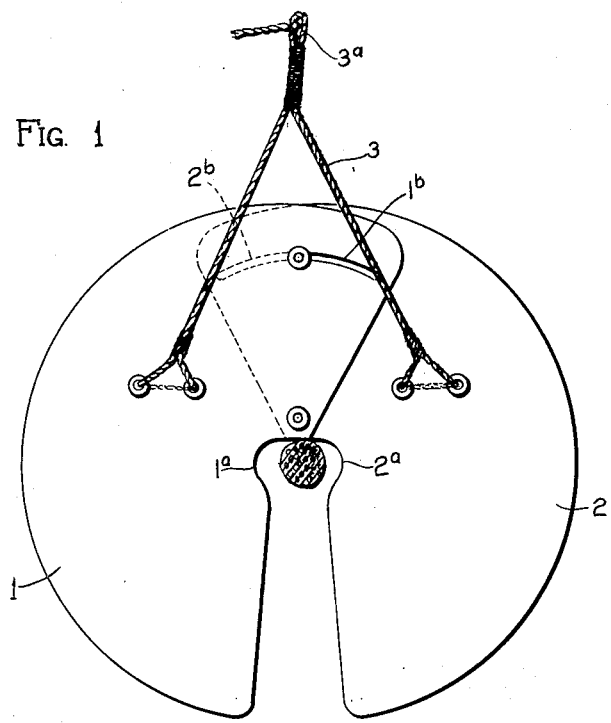
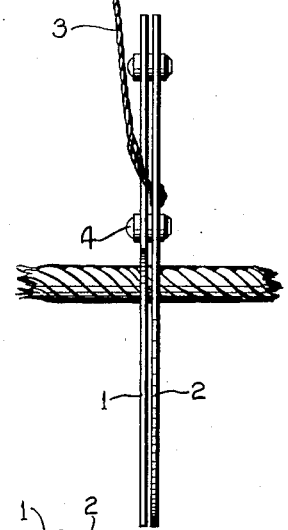
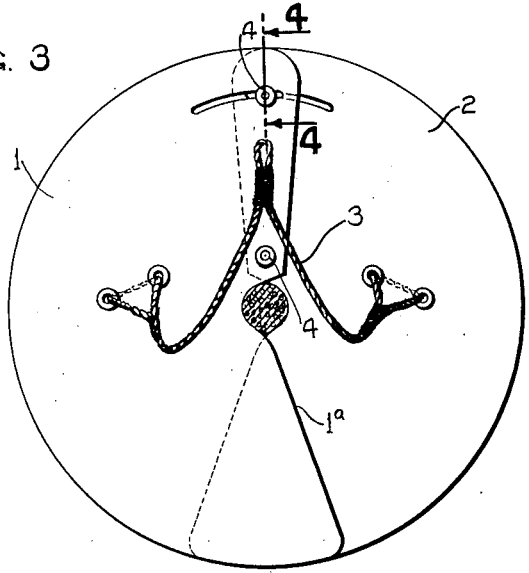
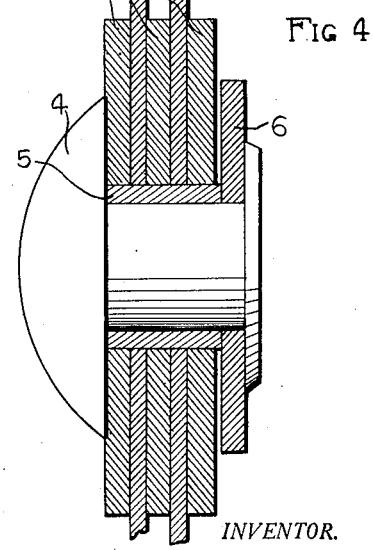
INVENTOR.
WILLIAM A. MEAD
BY A. B. Bowman
ATTORNEYS.

Patented Sept. 6, 1927.

1,641,345

UNITED STATES PATENT OFFICE.

WILLIAM A. MEAD, OF LOS ANGELES, CALIFORNIA.

RAT GUARD.

Application filed August 9, 1926. Serial No. 128,011.

My invention relates to a rat guard for preventing rats boarding or leaving a ship when tied to a dock, or the like, and the principal object of this invention is improvements over my application for Letters Patent for rat guard filed in the United States Patent Office, May 26th, 1926, Serial No. 111,721, and the principal objects of my improvement are;

First, to provide a simplified rat guard; second, to provide a more efficient rat guard of this class; third, to provide means for supporting the members in open relationship to each other when swinging the same on and off of the hawser, or the like; fourth, to provide a more efficient coupling for joining the members together; fifth, to provide a rat guard of this class in which the main guard members will readily shift to their closed and open positions by reason of their particular shape and connection and by the means for placing and removing the same from the hawser, and the like; sixth, to provide a novelly constructed rat guard; seventh, to provide a rat guard of this class in which the two main guard members are duplicates; eighth, to provide a rat guard of this class in which the separate members are held in spaced relation to each other so that they will not freeze, rust, or otherwise stick together; and, ninth, to provide a rat guard of this class which is very simple and economical of construction, durable, efficient and which will not readily be displaced, or get out of order, or deteriorate.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my rat guard shown positioned on a hawser which is shown in section, but shown in open position before closing; Fig. 2 is an edge view thereof; Fig. 3 is another side view thereof similar to that shown in Fig. 1, but showing the same closed over the hawser and ready for use, and Fig. 4 is an enlarged sectional view thereof taken through 4—4 of Fig. 3 showing particularly the pivotal and sliding connections of the main guard members.

Similar characters of reference refer to similar parts and portions throughout the several views of the drawings.

The main guard member 1, main guard member 2, cord 3, rivet members 4, tubular spacers 5, washers 6 and the separators 7 constitute the principal parts and portions of my rat guard.

The main guard members 1 and 2 are duplicates and interchangeable. They are preferably made of metal plate and substantially in the form of sectors of a circle of considerably greater extent than a semicircle. Said guard members are provided, preferably at their central portions, with substantially semi-circular notched portions $1^a$ and $2^a$ of sufficient size to receive and fit around the larger sized hawsers, as well as to contract around several smaller sized hawsers, when supported on the same, the lower inner edges overlapping each other to a considerable extent when supported on the hawser, as shown by solid and dotted lines in Fig. 3 of the drawings.

The guard members 1 and 2 are pivotally connected together and spaced from each other by a pivot, or connecting means, as will be described hereafter, said connecting or pivot means being positioned near and above the semi-circular notched portions $1^a$ and $2^a$ and near the radial edges extending upwardly and outwardly from the notched portions, as shown. These guard members are also slidably connected by another connecting means between the pivotal connection mentioned and the peripheral portions of the guard members at the normally upper portions. The latter connecting means extends through arcuate slots $1^b$ and $2^b$ which are concentric with the pivotal connecting means of the rat guard members.

The connecting means, both at the pivotal connection of the guard members and at the sliding connection thereof, consists of a tubular spacer 5 extending freely through holes in the guard members, a rivet 4 extending through the tubular spacer with its head against one end of the spacer, and a washer 6 positioned against the opposite end of the spacer and secured thereto by peening over the small end of the rivet, as shown. Between the rat guard members 1 and 2 and between the same and the head of the rivet and the washer 6, respectively, and around the tubular spacer are positioned separators 7 in the form of washers which are preferably made of metal or other material not readily corrosive. Thus the guard members are held in spaced relation with each other at all times, are free from endwise binding of the connecting means and are free to rotate about the pivotal connecting means, and also to shift freely about the connecting means extending through the arcuate slots 1$^b$ and 2$^b$.

It will be here noted that all the members of the connection means at the pivotal axis of the guard members are preferably made of material such as copper, bronze, and the like, while the members of the sliding connection means, positioned above the pivotal axis, are preferably made of a light material such as aluminum.

A cord, or light rope, is secured through spaced apart eyelets, or grommets, 1$^c$ and 2$^c$ in each of the guard members in the form of a yoke. Said eyelets, or grommets, there being a pair in each guard member, are positioned intermediate the notched portions 1$^a$ and 2$^a$ and the peripheries of the guard members substantially on lateral lines from the notched portions, as shown in Fig. 3. Said cord is preferably secured at its ends through the eyelets, or grommets, in each guard member and is provided at its middle portion with a loop, or eye, 3$^a$ to which is secured another cord or lanyard which is adapted for lowering the rat guard on a hawser, or the like, or removing the rat guard therefrom and for holding the same in position on the hawser, or the like, the required distance relative to the ship, or other article to be guarded. It will be here noted that the pivotal connection of the two guard members is positioned intermediate the pairs of eyelets, or grommets, in each guard member so that when tension is applied to the cord, the guard members automatically open up about the pivotal connection of said members.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a rat guard, a pair of metallic plates pivotally connected together and provided with extended overlapping portions at their normally lower inner sides when positioned on the ship's hawser, each plate provided with an approximately central opening to receive said ship's hawser, the walls surrounding said openings forming narrow bearing portions for engaging said hawser whereby said rat guard will automatically maintain a vertical closed position on the ship's hawser regardless of the angle of the ship's hawser, and cord means secured to each of said plates intermediate its sides for lowering and raising said rat guard to and from said ship's hawser and for opening the same when raising it from the hawser.

2. In a rat guard, a pair of duplicate metallic plates pivotally connected together and overlapping at their inner sides, each provided with an approximately central opening to receive the ship's hawser, and a cord secured to each of said members intermediate their sides and extending therefrom, whereby said rat guard members will spread for lowering the same on to the ship's hawser and when released will automatically close thereon.

3. In a rat guard, a pair of pivotally connected, flat plate members provided with an approximately central opening means, for holding the members in spaced relation to each other, and means for guiding said members in certain relation to each other during their pivotal movement.

4. In a rat guard, a pair of pivotally connected, flat plate members provided with an approximately central opening, and means for holding the members in spaced relation to each other, including a spacer, a rivet member extending through said spacer and provided with heads at its opposite ends, and a separator positioned on said spacer and between said plate members.

5. In a rat guard, a pair of flat plate members, and means pivotally connecting said plate members together to one side of their centers of gravity and adjacent their one edges, said plate members being provided with notched portions at said edges below their pivotal connections, said means including a spacer, a rivet extending through said spacer and provided with heads at the opposite ends of the spacer, and a separator positioned on said spacer between said plate members.

6. In a rat guard, a pair of flat plate members, and means pivotally connecting said plate members together to one side of their centers of gravity and adjacent their one edges, said plate members being provided with notched portions at said edges below their pivotal connections, said means including a tubular spacer extending beyond the outer sides of said plate members and loosely positioned in openings in said plate members, a rivet extending through said tubular spacer and provided with heads at the opposite ends of the spacer, and separators positioned around the tubular spacer and between said plate members, and the plate members and the heads of said rivet.

7. In a rat guard, a pair of pivotally connected, flat, circular plate members forming a circular guard provided with an approximately central opening, and means positioned between the central opening and the outer edges of said plate members for guiding said members in certain relation to each other during their pivotal movement.

8. In a rat guard, a pair of metallic plates pivotally connected together at one side of their centers and provided with greatly extended overlapping portions at their opposite sides of their centers forming integral counter-balance weights for maintaining said rat guard in certain position on the ship's hawser.

9. In a rat guard, a pair of metallic plates pivotally connected together at one side of their centers and provided with greatly extended overlapping portions at their opposite sides of their centers forming integral counter-balance weights for maintaining said rat guard in certain position on the ship's hawser, a cord secured to each of said plates intermediate its sides and formed into a loop, and another cord secured to said loop, whereby the rat guard will be held open when supported by said cords for positioning on the hawser and when the rat guard rests on the hawser at the opening, will automatically close on the hawser and maintain a vertical position on the hawser regardless of the angle of the ship's hawser.

10. In a rat guard, a pair of pivotally connected, flat plate members forming a guard provided with an approximately central opening, and means positioned between the central opening and the outer edges of said plate members for guiding said members in certain relation to each other during their pivotal movement.

In testimony whereof, I have hereunto set my hand at Los Angeles California this 26th day of July 1926.

WILLIAM A. MEAD.